United States Patent
Francl et al.

(10) Patent No.: US 6,842,625 B2
(45) Date of Patent: Jan. 11, 2005

(54) METHOD FOR AUTONOMOUS FREQUENCY MANAGEMENT FOR RELIABLE DATA COMMUNICATIONS

(75) Inventors: Michael J. Francl, Layton, UT (US); Dennis Carl Pulsipher, Farmington, UT (US); Roger W. Call, Salt Lake City, UT (US)

(73) Assignee: L-3 Communications Corporation, New York, NY (US)

( * ) Notice: Subject to any disclaimer, the term of this patent is extended or adjusted under 35 U.S.C. 154(b) by 631 days.

(21) Appl. No.: 09/966,490

(22) Filed: Sep. 27, 2001

(65) Prior Publication Data

US 2003/0060204 A1 Mar. 27, 2003

(51) Int. Cl.[7] .......................... H04B 7/00; H04B 7/185; H04Q 7/20; H04Q 7/28
(52) U.S. Cl. ...................... 455/522; 455/509; 455/450; 455/13.4; 370/318; 370/341
(58) Field of Search .............................. 455/13.4, 161.1, 455/161.2, 436, 446, 450, 451, 452.2, 455, 509, 516, 522; 370/318, 331, 332, 341, 343

(56) References Cited

U.S. PATENT DOCUMENTS

| | | | |
|---|---|---|---|
| 4,780,885 A | 10/1988 | Paul et al. | 375/40 |
| 4,872,205 A | 10/1989 | Smith | 455/58 |
| 5,142,691 A | 8/1992 | Freeburg et al. | 455/38.2 |
| 5,276,908 A | 1/1994 | Koohgoli et al. | 455/34.1 |
| 5,548,809 A | 8/1996 | Lemson | 455/34.1 |
| 5,943,622 A | 8/1999 | Yamashita | 455/509 |
| 6,067,458 A | * 5/2000 | Chen | 455/522 |
| 6,662,019 B2 | * 12/2003 | Kamel et al. | 455/522 |
| 6,760,587 B2 | * 7/2004 | Holtzman et al. | 455/436 |

* cited by examiner

*Primary Examiner*—Binh Tieu
*Assistant Examiner*—Thai Vu
(74) *Attorney, Agent, or Firm*—Perman & Green, LLP

(57) ABSTRACT

In accordance with one embodiment of the invention a method for reliable data communications system in a communications system is provided. The method comprises determining a desired data rate and determining a power level required to transceive at the desired data rate. The method includes determining a channel selection function and determining the power necessary to transceive on the selected channel given the desired data rate and the associated power necessary for that data rate. The method also includes a channel monitoring function for monitoring data communications once communications has been established and a channel search method if communications has been degraded.

49 Claims, 4 Drawing Sheets

METHOD FOR AUTONOMOUS FREQUENCY MANAGEMENT FOR RELIABLE DATA COMMUNICATIONS

BACKGROUND OF THE INVENTION

1. Field of the Invention

The present invention relates to wireless communications systems and, more particularly, to wireless devices operating in a channel limited environment.

2. Prior Art

Existing communications devices mitigate interference through a priori time division, ad hoc collision detection, or a priori frequency channel assignments. Interference or packet collisions in these types of systems are corrected or mitigated by waiting for a random period and resending the transmission or data packet on the same channel. The drawbacks of these systems range from the non-continuous transmission of data to real time coordination amongst the wireless devices.

SUMMARY OF THE INVENTION

In accordance with one embodiment of the invention a method for reliable data communications system in a communications system is provided. The method comprises the steps of determining a desired data rate and determining a power level required to transceive at the desired data rate. In addition the method includes determining a channel selection function for selecting a transceiver frequency channel. The method goes on to select the channel, measure the ambient power in that channel, and determine the power necessary to transceive on the channel given the desired data rate and associated power necessary for that data rate. If the ambient power is too high or otherwise undesirable the method provides steps for changing the selected channel to a second transceiver frequency channel. These steps include a second predetermined function to select the second channel, where the second function may take into account the reasons why the first channel is not available. Again the method provides steps for determining a second transceiver power level required to transceive on the second transceiver frequency channel and compares with the power level associated with the desired data rate. The method provides a user response step if the second transceiver frequency is not available.

In accordance with another embodiment the invention includes a method for transceiver data rate management in a communications system. The communications system having at least one base station and at least one remote station. The method comprises the steps of determining a first predetermined function and using the first predetermined function to select a first transceiver frequency channel, where the first transceiver frequency channel has a plurality of associated sub-channels. The method steps then apply a test to the selected transceiver frequency channel to determine if the channel is available according to predetermined criteria. If the channel is available the method sets the communications system to transceive on an associated sub-channel of the selected channel. The method then applies a second test to monitor bit error rate while the transceiver is transceiving on the selected channel. If the bit error rate should exceed a predetermined threshold a second predetermined function is used to determine a second channel. The communications system is then set to transceive on an associated sub-channel of the second channel. The method again monitors the quality of the system by applying a test to the second channel while the system is transceiving.

The invention is also directed towards a computer readable medium tangibly embodying a program of instructions executable by the machine to perform method steps for reliable data communications in a communications system. The method comprises the steps of determining a desired data rate and determining a power level required to transceive at the desired data rate. In addition the method includes determining a channel selection function for selecting a transceiver frequency channel. The method goes on to select the channel, measure the ambient power in that channel, and determine the power necessary to transceive on the channel given the desired data rate and associated power necessary for that data rate. If the ambient power is to high or otherwise undesirable the method provides steps for changing the selected channel to a second transceiver frequency channel. These steps include a second predetermined function to select the second channel, where the second function may take into account the reasons why the first channel is not available. Again the method provides steps for determining a second transceiver power level required to transceive on the second transceiver frequency channel and compares with the power level associated with the desired data rate. The method provides a user response step if the second transceiver frequency is not available.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
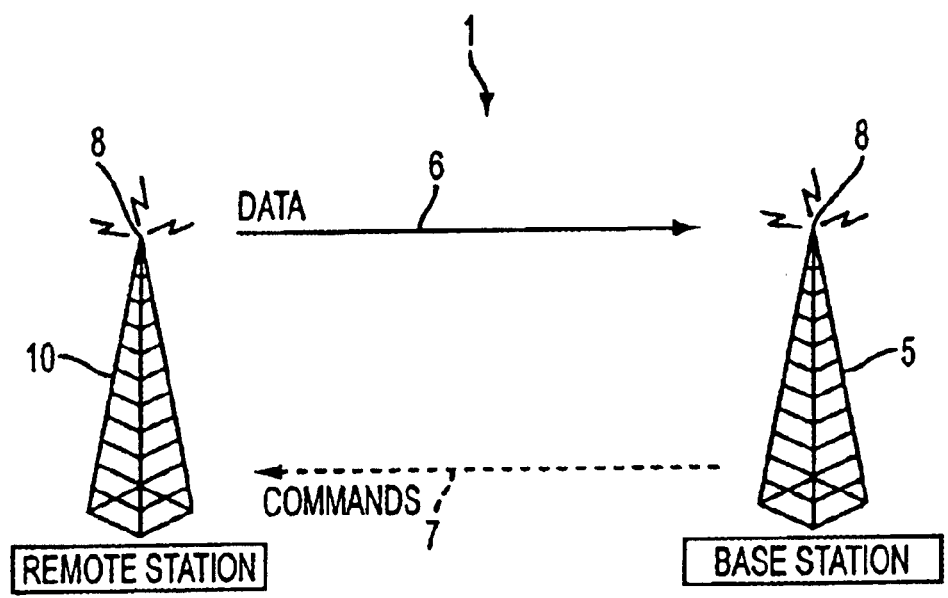
FIG. 1 shows a pictorial representation of a ground control station and a remote station incorporating features of the present invention.

Referring to FIG. 1, there is shown a perspective view of a base station 5 and a remote platform 10 incorporating features of the present invention. Although the present invention will be described with reference to the single embodiment shown in the drawings, it should be understood that the present invention can be embodied in many alternate forms of embodiments. For example, the communications system 1 represented in FIG. 1 is considered to have a base station and a remote station. However, in alternate embodiments any suitable number of base stations and remote or wireless devices could be provided. In addition, the symbols used for the remote station 10 and the base station 5 suggest ground stations, however in alternate embodiments any suitable combination of ground, air, or space stations could be provided. Another alternate embodiment may be a duplex communication system, where the base station 5 is identified as the receiving end of each connection, resulting in asymmetric wireless communications with each half of the duplex system setting its speed and frequency independently.

Figure 4:
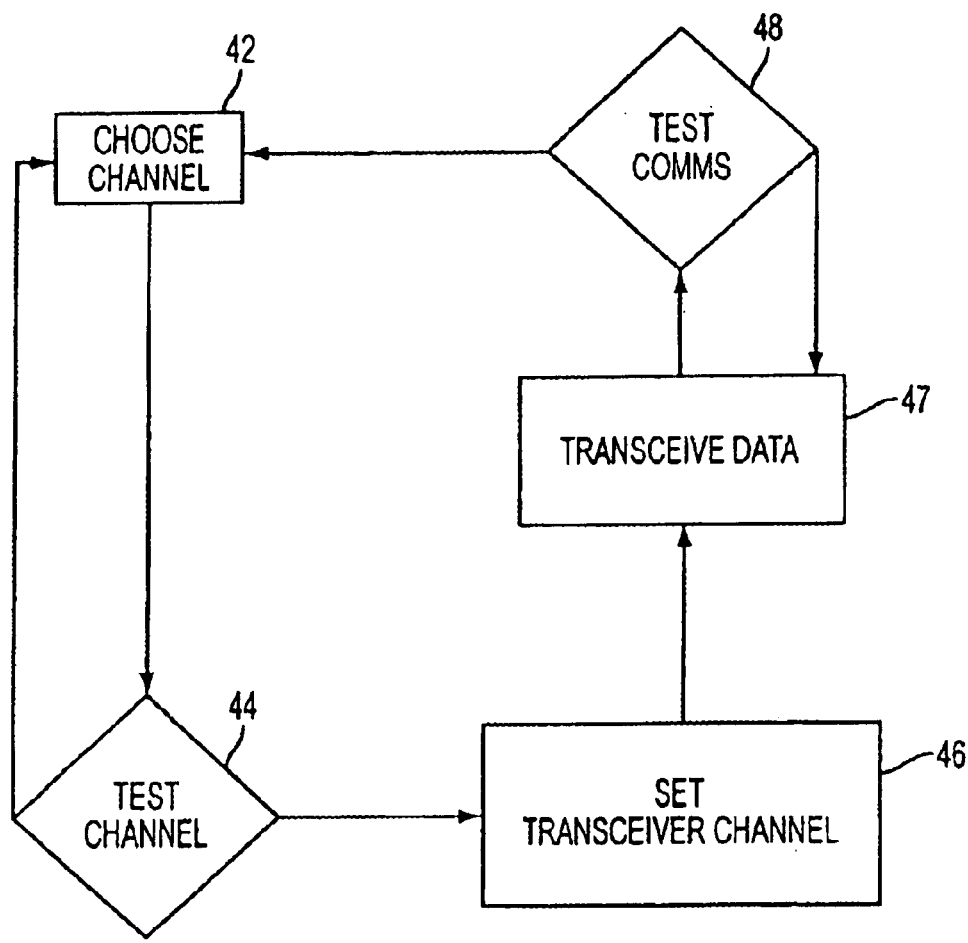
FIG. 4 is a high level block diagram of one method for autonomous frequency management of the system shown in FIG. 1.

Referring also to FIG. 4 there is shown a high level block diagram of one method for autonomous frequency management of the system shown in FIG. 1. In this form the method comprises the step 42 of choosing a channel which is then tested 44. Testing may consist of comparing the power level required for a desired reliable data rate with the ambient power in the chosen channel. An ambient power level would indicate a transmitter operating in the channel and at what the power the transmitter is operating and if the transmitter is likely to interfere with transceiving the desired data rate. Transceiving data is understood to mean both transmitting and receiving. Once a selected channel has passed the test step 44 the transceiver communications system is set 46 to that channel and commences 47 to transceive data. While system 1 is transceiving data it is also monitoring 48 the transceived data to dynamically determine if the data is being reliably transceived. One form of monitoring may be to measure bit error rates (BER). BERs are well known in the art and will not be discussed here. If the BER exceeds a predetermined threshold the system again selects 42 a new channel. Some factors that may be considered in determining an acceptable BER may be availability of alternate channels, required power levels, and timing requirements. These same factors may also be part of the channel availability test 44. In alternate embodiments any suitable type of testing factors could be considered for both the channel availability test 44 and the data reliability test 48.

Figure 2:
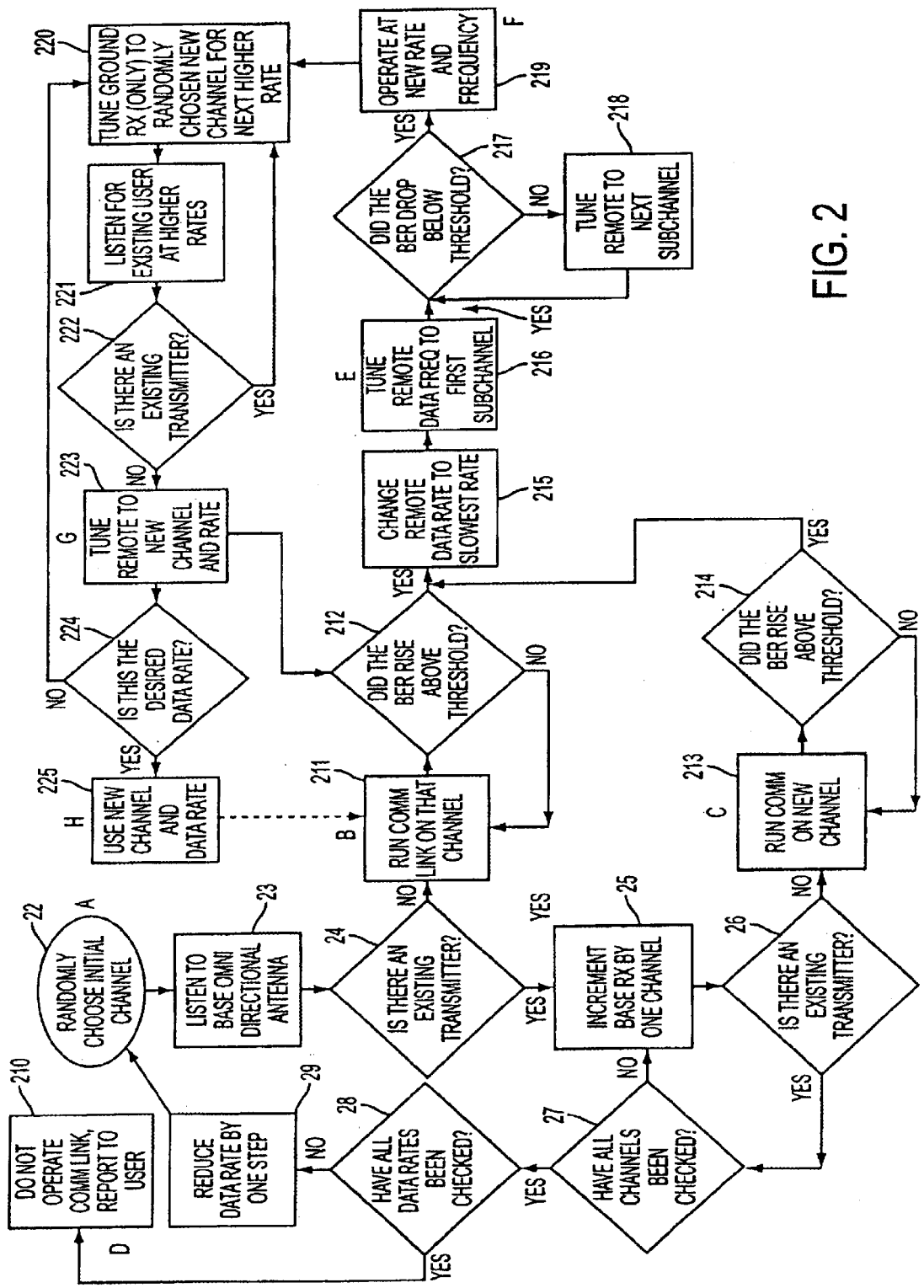
FIG. 2 is a detailed flowchart of one method for autonomous frequency management of the system shown in FIG. 1.
Figure 3:
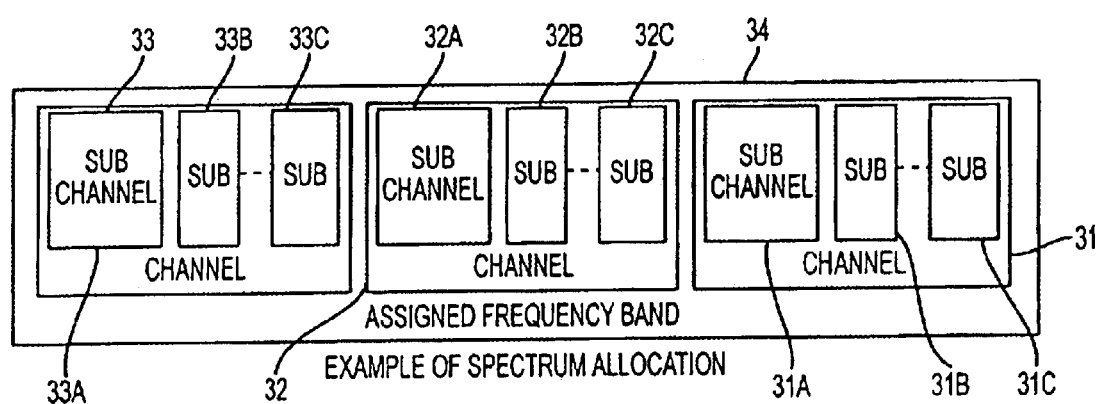
FIG. 3 is a block diagram of one embodiment of a assigned frequency band according to FIG. 2.

Referring also to FIG. 2 and FIG. 3 there is shown a detailed flowchart of one method for autonomous frequency management of the system shown in FIG. 1 and an example of spectrum allocation, respectively. A starting channel 31–33 (see FIG. 3) is randomly chosen 22 (see FIG. 2) from an assigned frequency band 34, to provide greater inherent user diversity. In alternate embodiments the channel could be chosen by any suitable type of selection function. For example a weighted probability function could also be used. A weighted probability function could take into account various factors such as environmental conditions, desired power levels, and channel availability based on previous history. Before initiating a communications link 6 (see FIG. 1), the base station 5 senses or listens 23, or otherwise detects, other users in one of the defined frequency channels 31,32,33, using an omni directional antenna 8. In alternate embodiments the base station 5 could use any suitable type of detection device to determine the availability of the selected channel. For example the base station 5 could use a power level meter to measure field strength. In alternate embodiments the number of available channels per frequency band and the number of sub channels per channel can be more or less than what is shown in FIG. 3.

If the base station 5 does not detect 24 other users on the selected channel, at any of the allowed data rates, it proceeds to initiate 211 communications to the remote station 10 over that channel, usually at the highest data possible within that channel. The communications may use omni directional or directional antennas.

If the base station 5 detects another user in that frequency channel, it increments 25 its receiver to the next sequential channel. The base station 5 receiver again listens 26 for other users. If it does not find another user in the channel, it initiates 213 the communications on this open channel. If it finds another user on the channel, it steps 25 to the next frequency channel. Again, the base station 5 determines 26 if there is an existing transmitter. If the base station 5 does not detect an existing transmitter then communications are initiated 213 on the new channel. In alternate embodiments the base station 5 could make a determination that the channel is unavailable for reasons other than a pre-existing transmitter. For example, the base station 5 could determine that the channel is unavailable for reasons to due to poor transmission quality for the channel and desired data rates.

If all the available channels have been checked 27 and if the base station 5 does not find an open user channel, it decrements 29 the desired data rate and searches all of its assigned frequency channels (which require less bandwidth than the original data rate) in the same manner. In other words, the desired data rate is reduced 29 and a channel capable of accommodating the reduced data rate is again randomly selected 22 from the assigned frequency band (see FIG. 3). If the base station 5 decrements down to its lowest data rate and still cannot find an appropriate and open channel 28, it does not initiate a link to the remote station and informs the user of the situation 210.

Assuming the base station 5 eventually finds an open channel at some data rate it initiates a wireless communications link 6 with the remote station 10. The base station 5 initiates this link by signaling to the remote station 10 (either by an out of band method or another prearranged channel 7) the frequency and data rate the remote station 10 must use to communicate with the base station 5. The wireless link 6 can use omni directional or directional antennas. Directional antennas support spatial diversity as well as frequency diversity for spectrum re-use.

Once the communications link 6 is running, the base station 5 monitors 212 the received bit error rate of the remote station's transmitted signal. If the bit error rate goes above a predetermined threshold, the base station 5 assumes that the communications is being impeded by interference, most likely from another independently operated communications link using similar waveforms in the same frequency band. The bit error rate threshold may also be combined with a minimum time period, to provide hysteresis to the decision process and avoid the intermittent and relatively insignificant disruptions driving the communications links to an unstable operation.

If the bit error rate remains above the threshold for the determined amount of time, the base station 5 commands 215,216 the remote station 10 to transmit at its slowest data rate, in the first sub-channel located within the original frequency channel. Each data rate will have a full set of predetermined sub-channels spanning the allowed frequency band (see FIG. 3).

With the remote station 10 transmitting at the same power, but a much lower data rate, it is very likely to be able to overcome the interference and drive the base station's received bit error rate back below the bit error rate threshold.

Once the base station 5 has reacquired the remote station's signal, it checks 217 the received bit error rate. If the bit error rate is still above the threshold, the base station commands the remote station to tune 218 to the next contiguous sub-channel. The base station 5 continues to command the remote station 10 to new sub-channels until the bit error rate falls below the threshold.

Once the base station has reestablished reliable communications 219 with the remote station, it looks for a new, open channel suitable for the original higher data rate. This search can be set to occur on a part time basis, to allow some use of the link at a lower data rate. The base station tunes 220 to the alternate frequency channels outside the existing channel originally used for the higher rate communications. The base station receiver steps through these channels in random order, but keeps track of which channels it has already tested. The base station receiver does not send tuning changes to the remote station during this search. In alternate embodiments the base station 5 could employ alternate selection methods such as recursive probability functions to tune for a new channel 220.

At each alternate frequency channel, the base station 5 checks 222 to see if another user is occupying the channel at that data rate. If the channel is not occupied, the base station commands 223 the remote transmitter to that channel and data rate detected by steps 220–222.

The communications link 6 then operates at that rate while the base station continues to look 220–223 for a different rate channel if it determines 224 that the rate is not the desired data rate. The base station continues to search for the desired rate and open channel frequencies until the communications link is again operating reliably at the previous or desired data rate 225. If the base station cannot find an open channel at the desired rate, it continues to run at the rate it can reliably operate.

It should be understood that the foregoing description is only illustrative of the invention. Various alternatives and modifications can be devised by those skilled in the art without departing from the invention. For example, the method illustrated in FIG. 2 could use more steps for measuring the quality of the transceived data, in addition to monitoring the BER. Alternatively, the method in FIG. 2 could use less steps such as only changing the channel and data rate once rather than looping through all channels and rates 27–29. Accordingly, the present invention is intended to embrace all such alternatives, modifications and variances which fall within the scope of the appended claims.

What is claimed is:

1. A method for reliable data communications system in a communications system, the method comprising the steps of:
   determining a first data rate;
   determining a first power level required to transceive at the first data rate;
   determining a first predetermined function;
   using the first predetermined function to select a first transceiver frequency channel, the first transceiver frequency channel having at least one sub-channel associated with the first transceiver frequency channel;
   determining if the first transceiver frequency channel is available, wherein the step of determining if the first transceiver frequency is available further comprises the steps of:
      determining a first transceiver power level required to transceive on the first transceiver frequency channel;
      comparing the first transceiver power level required to transceive on the first transceiver frequency channel with the first power level;
      transceiving data on the first transceiver frequency channel in response to the step of determining based upon the step of comparing the first transceiver power level required to transceive on the first transceiver frequency channel with the first power level;
   changing the first transceiver frequency channel to a second transceiver frequency channel in response to the step of determining the first transceiver frequency channel is not available, the second transceiver frequency channel having at least one sub-channel associated with the second transceiver frequency channel, wherein the second transceiver frequency channel is associated with the first data rate, wherein the step of changing the first transceiver frequency channel to a second transceiver frequency channel further comprises the steps of:
      using a second predetermined function to select a second transceiver frequency channel;
      determining a second transceiver power level required to transceive on the second transceiver frequency channel;
      comparing the second transceiver power required to transceive on the second transceiver frequency channel with the first power level;
   transceiving data on the second transceiver frequency channel in response to the step of determining if the second transceiver frequency channel is available; and
   alerting a user in response to the step of determining if the second transceiver frequency channel is not available.

2. A method as in claim 1 wherein the step of using the first predetermined function to select the first transceiver frequency channel further comprises the step of using a first random function.

3. A method as in claim 1 wherein the step of using the first predetermined function to select the first transceiver frequency channel further comprises the step of using a first probability function.

4. A method as in claim 3 wherein the step of using the first probability function further comprises the steps of:
   determining a first set of weighing factors; and
   weighting the first probability function with the first set of weighting factors.

5. A method as in claim 1 wherein the step of using the second predetermined function to select the second transceiver frequency channel further comprises the step of using a second random function.

6. A method as in claim 1 wherein the step of using the second predetermined function to select the second transceiver frequency channel further comprises the step of using a second probability function.

7. A method as in claim 6 wherein the step of using the second probability function further comprises the steps of:
   determining a second set of weighing factors; and
   weighting the second probability function with the second set of weighting factors.

8. A method as in claim 1 wherein the step of using the second predetermined function further comprises the step of using a summing function.

9. A method as in claim 1 wherein the step of determining the first transceiver power level required to transceive on the first transceiver frequency channel further comprises the step of:
   measuring a first ambient power level associated with the first transceiver frequency channel, wherein the step of measuring the first ambient power level further comprises the step of selecting a power measuring device from the group consisting of:
      at least one omni-antenna;
      at least one directional antenna; and
      at least one field strength meter.

10. A method as in claim 1 wherein the step of transceiving data on the first transceiver frequency channel further comprises the step of transceiving data in accordance with code division multiple access protocol.

11. A method as in claim 1 wherein the step of transceiving data on the first transceiver frequency channel further comprises the step of transceiving data in accordance with time division multiple access protocol.

12. A method as in claim 1 wherein the step of determining the second transceiver power level required to transceive on the second transceiver frequency channel further comprises the step of:
   measuring a second ambient power level associated with the second transceiver frequency channel, wherein the step of measuring the second ambient power level further comprises the step of selecting a second power measuring device from the group consisting of:

at least one omni-antenna;
at least one directional antenna; and
at least one field strength meter.

13. A method as in claim 1 wherein the step of transceiving data on the second transceiver frequency channel further comprises the step of transceiving data in accordance with code division multiple access protocol.

14. A method as in claim 1 wherein the step of transceiving data on the second transceiver frequency channel further comprises the step of transceiving data in accordance with time division multiple access protocol.

15. A method as in claim 1 wherein the step of comparing the first transceiver power level required to transceive on the first transceiver frequency channel with the first power level further comprises the step of predetermining a first transceiver frequency channel priority criteria.

16. A method as in claim 1 wherein the step of comparing the second transceiver power level required to transceive on the second transceiver frequency channel with the second power level further comprises the step of predetermining a second transceiver frequency channel priority criteria.

17. A method as in claim 1 wherein the step of transceiving data on the first transceiver frequency channel in response to the step of determining if the first transceiver frequency channel is available further comprises the steps of:
    determining a first bit error rate (BER) threshold;
    measuring the transceived BER;
    comparing the transceived BER with the first BER threshold;
    changing the first data rate to a second data rate based upon the results of the comparison of the transceived BER with the first BER threshold, wherein the step of changing the first data rate to the second data rate further comprises the step of changing the first transceiver frequency channel to the at least one sub-channel associated with the first transceiver frequency channel.

18. A method as in claim 17 wherein the step of determining the first BER threshold further comprises the step of determining a first BER threshold criteria set.

19. A method as in claim 17 wherein the step of changing the first data rate to the second data rate further comprises the step of substantially concurrently searching for a third data rate while transceiving data at the second data rate.

20. A method as in claim 19 wherein the step of substantially concurrently searching for the third data rate while transceiving data at the second data rate further comprises the steps of:
    determining the third data rate;
    determining a third power level required to transceive at the third data rate;
    determining a third predetermined function;
    using the third predetermined function to select a third transceiver frequency channel, the third transceiver frequency channel having at least one sub-channel associated with the third transceiver frequency channel;
    determining if the third transceiver frequency channel is available, wherein the step of determining if the third transceiver frequency is available further comprises the steps of:
        determining a third transceiver power level required to transceive on the third transceiver frequency channel;
        comparing the third transceiver power level required to transceive on the third transceiver frequency channel with the third power level; and
    transceiving data on the third transceiver frequency channel in response to the step of determining if the third transceiver frequency channel is available.

21. A method as in claim 20 wherein the step of using the third predetermined function to select the third transceiver frequency channel further comprises the step of using a third random function.

22. A method as in claim 20 wherein the step of using the third predetermined function to select the third transceiver frequency channel further comprises the step of using a third probability function.

23. A method as in claim 22 wherein the step of using the third probability function further comprises the steps of:
    determining a third set of weighing factors; and
    weighting the third probability function with the first set of weighting factors.

24. A method as in claim 20 wherein the step of determining the third transceiver power level required to transceive on the third transceiver frequency channel further comprises the step of:
    measuring a third ambient power level associated with the third transceiver frequency channel, wherein the step of measuring the third ambient power level further comprises the step of selecting a power measuring device from the group consisting of:
    at least one omni-antenna;
    at least one directional antenna; and
    at least one field strength meter.

25. A method as in claim 20 wherein the step of transceiving data on the third transceiver frequency channel further comprises the step of transceiving data in accordance with code division multiple access protocol.

26. A method as in claim 20 wherein the step of transceiving data on the third transceiver frequency channel further comprises the step of transceiving data in accordance with time division multiple access protocol.

27. A method as in claim 20 wherein the step of comparing the third transceiver power level required to transceive on the third transceiver frequency channel with the third power level further comprises the step of predetermining a third transceiver frequency channel priority criteria.

28. A method as in claim 1 wherein the step of transceiving data on the second transceiver frequency channel in response to the step of determining if the second transceiver frequency channel is available further comprises the steps of:
    determining a second bit error rate (BER) threshold;
    measuring the transceived BER;
    comparing the transceived BER with the second BER threshold;
    changing the first data rate to a fourth data rate based upon the results of the comparison of the transceived BER with the second BER threshold, wherein the step of changing the first data rate to the fourth data rate further comprises the step of changing the second transceiver frequency channel to the at least one sub-channel associated with the second transceiver frequency channel.

29. A method as in claim 28 wherein the step of determining the second BER threshold further comprises the step of determining a second BER threshold criteria set.

30. A method as in claim 28 wherein the step of changing the first data rate to the fourth data rate further comprises the step of substantially concurrently searching for a fifth data rate while transceiving data at the fourth data rate.

31. A method as in claim 30 wherein the step of substantially concurrently searching for the fifth data rate while transceiving data at the fourth data rate further comprises the steps of:

determining the fifth data rate;
determining a fifth power level required to transceive at the fifth data rate;
determining a fifth predetermined function;
using the fifth predetermined function to select a fifth transceiver frequency channel, the fifth transceiver frequency channel having at least one sub-channel associated with the fifth transceiver frequency channel;
determining if the fifth transceiver frequency channel is available, wherein the step of determining if the fifth transceiver frequency is available further comprises the steps of:
　determining a fifth transceiver power level required to transceive on the fifth transceiver frequency channel;
　comparing the fifth transceiver power level required to transceive on the fifth transceiver frequency channel with the fifth power level; and
transceiving data on the fifth transceiver frequency channel in response to the step of determining if the fifth transceiver frequency channel is available.

32. A method as in claim 31 wherein the step of using the fifth predetermined function to select the fifth transceiver frequency channel further comprises the step of using a fifth random function.

33. A method as in claim 31 wherein the step of using the fifth predetermined function to select the fifth transceiver frequency channel further comprises the step of using a fifth probability function.

34. A method as in claim 31 wherein the step of using the fifth probability function further comprises the steps of:
　determining a fifth set of weighing factors; and
　weighting the fifth probability function with the first set of weighting factors.

35. A method as in claim 31 wherein the step of determining the fifth transceiver power level required to transceive on the fifth transceiver frequency channel further comprises the step of:
　measuring a fifth ambient power level associated with the fifth transceiver frequency channel, wherein the step of measuring the fifth ambient power level further comprises the step of selecting a power measuring device from the group consisting of:
　　at least one omni-antenna;
　　at least one directional antenna; and
　　at least one field strength meter.

36. A method as in claim 31 wherein the step of transceiving data on the fifth transceiver frequency channel further comprises the step of transceiving data in accordance with code division multiple access protocol.

37. A method as in claim 31 wherein the step of transceiving data on the fifth transceiver frequency channel further comprises the step of transceiving data in accordance with time division multiple access protocol.

38. A method as in claim 31 wherein the step of comparing the fifth transceiver power level required to transceive on the fifth transceiver frequency channel with the fifth power level further comprises the step of predetermining a fifth transceiver frequency channel priority criteria.

39. A method for transceiver data rate management in a communications system, the communications system having at least one base station and at least one remote station, the method comprising the steps of:
　determining a first predetermined function;
　using the first predetermined function to select a first transceiver frequency channel, the first transceiver frequency channel having a plurality of associated sub-channels;
　applying a first test to the first transceiver frequency channel;
　setting the communications system to transceive on an associated sub-channel of the first transceiver frequency channel if the step of applying the first test to the first transceiver frequency channel indicates the first transceiver frequency channel is available;
　applying a second test to the first transceiver frequency channel while the communications system is transceiving on the first transceiver frequency channel;
　determining a second predetermined function;
　using the second predetermined function to choose a second transceiver frequency channel if the step of applying the first test to the first transceiver frequency channel indicates the first transceiver frequency channel is not available, the second transceiver frequency channel having a plurality of associated sub-channels;
　setting the communications system to transceive on an associated sub-channel of the second transceiver frequency channel;
　applying a third test to the second transceiver frequency channel while the communications system is transceiving on the second transceiver frequency channel.

40. A method as in claim 39 wherein the step of using the first predetermined function to select the first transceiver frequency channel further comprises the step of using a first randomized function.

41. A method as in claim 39 wherein the step of using the first predetermined function to select the first transceiver frequency channel further comprises the step of using a first probability function.

42. A method as in claim 41 wherein the step of using the first probability function further comprises the steps of:
　determining a first set of weighing factors; and
　weighting the first probability function with the first set of weighting factors.

43. A method as in claim 39 wherein the step of applying the first test to the first transceiver frequency channel further comprises the steps of:
　determining a first desired transmit power level;
　measuring an ambient power level associated with the first transceiver frequency channel; and
　comparing the first desired transmit power level with the measured ambient power level associated with the first transceiver frequency channel.

44. A method as in claim 39 wherein the step of applying the second test to the first transceiver frequency channel while the communications system is transceiving further comprises the steps of:
　predetermining a first transceiver bit error rate (BER) threshold;
　monitoring the first transceiver frequency channel bit error rate (BER); and
　changing the associated sub-channel of the first transceiver frequency channel if the monitored first transceiver frequency channel BER exceeds the predetermined first transceiver BER threshold.

45. A method as in claim 39 wherein the step determining a second predetermined function further comprises the steps of using a second randomized function.

46. A method as in claim 39 wherein the step of using the second predetermined function to select the second transceiver frequency channel further comprises the step of using a second probability function.

47. A method as in claim 46 wherein the step of using the second probability function further comprises the steps of:

determining a second set of weighing factors; and weighting the second probability function with the second set of weighting factors.

48. A method as in claim 39 wherein the step of applying the third test to the first transceiver frequency channel while the communications system is transceiving further comprises the steps of:

predetermining a second transceiver bit error rate (BER) threshold;

monitoring the second transceiver frequency channel bit error rate (BER); and changing the associated sub-channel of the second transceiver frequency channel if the monitored second transceiver frequency channel BER exceeds the predetermined second transceiver BER threshold.

49. A program storage device readable by a machine, tangibly embodying a program of instructions executable by the machine to perform method steps for reliable data communications a communications system, said method steps comprising:

determining a first data rate;

determining a first power level required to transceive at the first data rate;

determining a first predetermined function;

using the first predetermined function to select a first transceiver frequency channel, the first transceiver frequency channel having at least one sub-channel associated with the first transceiver frequency channel;

determining if the first transceiver frequency channel is available, wherein the step of determining if the first transceiver frequency is available further comprises the steps of:

determining a first transceiver power level required to transceive on the first transceiver frequency channel;

comparing the first transceiver power level required to transceive on the first transceiver frequency channel with the first power level;

transceiving data on the first transceiver frequency channel in response to the step of determining based upon the step of comparing the first transceiver power level required to transceive on the first transceiver frequency channel with the first power level;

changing the first transceiver frequency channel to a second transceiver frequency channel in response to the step of determining the first transceiver frequency channel is not available, the second transceiver frequency channel having at least one sub-channel associated with the second transceiver frequency channel, wherein the second transceiver frequency channel is associated with the first data rate, wherein the step of changing the first transceiver frequency channel to a second transceiver frequency channel further comprises the steps of:

using a second predetermined function to select a second transceiver frequency channel;

determining a second transceiver power level required to transceive on the second transceiver frequency channel;

comparing the second transceiver power required to transceive on the second transceiver frequency channel with the first power level;

transceiving data on the second transceiver frequency channel in response to the step of determining if the second transceiver frequency channel is available; and alerting a user in response to the step of determining if the second transceiver frequency channel is not available.

* * * * *